(12) United States Patent
Tseng et al.

(10) Patent No.: US 9,539,999 B2
(45) Date of Patent: Jan. 10, 2017

(54) VEHICLE OPERATOR MONITORING AND OPERATIONS ADJUSTMENTS

(71) Applicant: Ford Global Technologies, LLC, Dearborn, MI (US)

(72) Inventors: Fling Tseng, Ann Arbor, MI (US); Hsin-hsiang Yang, Ann Arbor, MI (US); Kwaku O. Prakah-Asante, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 16 days.

(21) Appl. No.: 14/193,546

(22) Filed: Feb. 28, 2014

(65) Prior Publication Data

US 2015/0246673 A1    Sep. 3, 2015

(51) Int. Cl.
| | |
|---|---|
| *B60W 30/00* | (2006.01) |
| *B60W 50/00* | (2006.01) |
| *B60W 30/12* | (2006.01) |
| *B60W 30/16* | (2012.01) |
| *G08B 23/00* | (2006.01) |

(52) U.S. Cl.
CPC .............. *B60W 30/00* (2013.01); *B60W 30/12* (2013.01); *B60W 30/16* (2013.01); *B60W 50/0098* (2013.01); *B60W 2050/0089* (2013.01); *B60W 2540/22* (2013.01)

(58) Field of Classification Search
CPC ............... G08B 5/00; G06F 3/02; G05D 1/00; B60T 7/22

USPC ..... 701/23, 26, 29.2; 340/573.1, 576, 425.5, 340/438; 345/168
See application file for complete search history.

(56) References Cited

U.S. PATENT DOCUMENTS

| | | | | |
|---|---|---|---|---|
| 8,450,677 | B2 * | 5/2013 | Jones et al. ............ | 250/214 AL |
| 8,874,301 | B1 * | 10/2014 | Rao et al. ........................ | 701/25 |
| 9,002,563 | B2 * | 4/2015 | Green et al. .................... | 701/23 |
| 2008/0119994 | A1 * | 5/2008 | Kameyama ..................... | 701/48 |
| 2008/0231461 | A1 * | 9/2008 | Sanchez et al. .............. | 340/575 |
| 2008/0252466 | A1 * | 10/2008 | Yopp et al. ................... | 340/576 |
| 2009/0287367 | A1 | 11/2009 | Salinger | |
| 2012/0271500 | A1 | 10/2012 | Tsimhoni et al. | |
| 2013/0226408 | A1 * | 8/2013 | Fung .................... | B60W 40/09 701/41 |

FOREIGN PATENT DOCUMENTS

| | | |
|---|---|---|
| DE | 10144797 A1 | 3/2003 |
| WO | WO 2013127387 | 9/2013 |

* cited by examiner

*Primary Examiner* — Tan Q Nguyen

(74) *Attorney, Agent, or Firm* — Frank MacKenzie; Bejin Bieneman PLC

(57) ABSTRACT

A vehicle computer is configured to perform one or more operations of the vehicle without occupant input. Data is stored relating to a baseline occupant state. Data is collected relating to a current occupant state. A comparison is performed of the baseline occupant state to the current occupant state. A parameter is modified governing performance of the one or more operations according to the comparison.

17 Claims, 2 Drawing Sheets

VEHICLE OPERATOR MONITORING AND OPERATIONS ADJUSTMENTS

BACKGROUND

A vehicle such as an automobile may be configured for autonomous driving operations. For example, the vehicle may include a central control unit or the like, i.e., the computing device having a processor and a memory, that receives data from various vehicle data collection devices such as sensors and generally also external data sources such as navigation information. The central control unit may then provide instructions to various vehicle components, e.g., actuators and the like that control steering, braking, acceleration, etc., to control vehicle operations without action by a human operator. Therefore, it is possible for an autonomous vehicle to operate irrespective of a state or condition of a human operator. However, a human operator's state or condition may vary depending on a manner in which a vehicle is being operated.

DRAWINGS

DETAILED DESCRIPTION

System Overview

Figure 1:
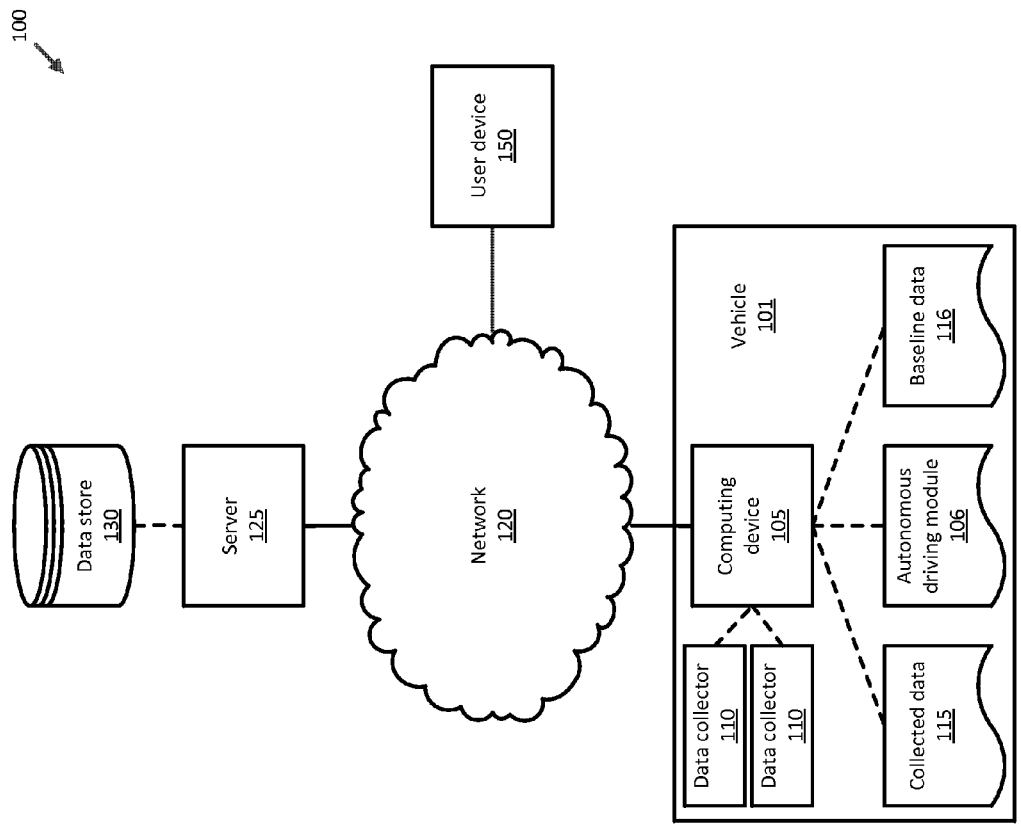
FIG. 1 is a block diagram of an exemplary autonomous vehicle system.

FIG. 1 is a block diagram of an exemplary autonomous vehicle system 100. A vehicle 101 includes a vehicle computer 105 that generally includes an autonomous driving module 106 that comprises instructions for autonomously or semi-autonomously operating the vehicle 101, i.e., operating the vehicle 101 completely without operator input, or performing at least some operations of the vehicle 101, e.g., controlling one or more speed, steering, climate control, etc., without operator input. Accordingly, the computer 105 generally is configured to receive information, e.g., collected data 115, from one or more data collectors 110 concerning various metrics related to a vehicle operator and/or the vehicle 101. For example, such metrics may include a speed (i.e., velocity) of the vehicle 101, vehicle acceleration and/or deceleration, data related to a vehicle path or steering, etc.

In addition, the computer 105 may receive collected biometric data 115 related to a vehicle operator, e.g., heart rate, respiration, pupil dilation, body temperature, facial expressions, state of consciousness, etc. Further, collected biometric data 115 may be compared to baseline data 116 stored in a memory of the computing device 105 for one or more vehicle 101 operator or operators. The computer 105 may use results of such comparison to determine a vehicle 101 operator state of stress or anxiety, and further to determine one or more adjustments to vehicle 101 operations to alleviate operator stress or anxiety. For example, where a vehicle 101 had been operating according to a relatively aggressive driving style, e.g., maintaining a relatively close distance to other vehicles 101, changing lanes frequently to pass other vehicles 101, accelerating as rapidly as safely possible, etc., operator anxiety or stress could indicate to move to a less aggressive driving style.

Further, the computer 105 may be configured to record operator actions, such as operator interventions modifying autonomous or semi-autonomous vehicle 101 operations. For example, where a vehicle 101 operator manually applied brakes ahead of braking planned by the autonomous module 106, or took control of vehicle 101 steering to prevent the module 106 from executing a lane change, the computer 105 could record such action and/or implement a less aggressive driving style.

Exemplary System Elements

A vehicle 101 includes a vehicle computer 105 that generally includes a processor and a memory, the memory including one or more forms of computer-readable media, and storing instructions executable by the processor for performing various operations, including as disclosed herein. Further, the computer 105 may include more than one computing device, e.g., controllers or the like included in the vehicle 101 for monitoring and/or controlling various vehicle components, e.g., an engine control unit (ECU), transmission control unit (TCU), etc. The computer 105 is generally configured for communications on a controller area network (CAN) bus or the like. The computer 105 may also have a connection to an onboard diagnostics connector (OBD-II).

Via the CAN bus, OBD-II, and/or other wired or wireless mechanisms, the computer 105 may transmit messages to various devices in a vehicle and/or receive messages from the various devices, e.g., controllers, actuators, sensors, etc., including data collectors 110. Alternatively or additionally, in cases where the computer 105 actually comprises multiple devices, the CAN bus or the like may be used for communications between devices represented as the computer 105 in this disclosure. In addition, the computer 105 may be configured for communicating with the network 120, which, as described below, may include various wired and/or wireless networking technologies, e.g., cellular, Bluetooth, wired and/or wireless packet networks, etc.

Generally included in instructions stored in and executed by the computer 105 is an autonomous driving module 106. Using data received in the computer 105, e.g., from data collectors 110, the server 125, etc., the module 106 may control various vehicle 101 components and/or operations without a driver to operate the vehicle 101. For example, the module 106 may be used to regulate vehicle 101 speed, acceleration, deceleration, steering, climate control, operation of components such as lights, windshield wipers, etc.

Data collectors 110 may include a variety of devices. For example, various controllers in a vehicle may operate as data collectors 110 to provide data 115 via the CAN bus, e.g., data 115 relating to vehicle speed, acceleration, etc. Further, sensors or the like, global positioning system (GPS) equipment, etc., could be included in a vehicle and configured as data collectors 110 to provide data directly to the computer 105, e.g., via a wired or wireless connection. Sensor data collectors 110 could include mechanisms such as RADAR, LADAR, sonar, etc. sensors that could be deployed to measure a distance between the vehicle 101 and other vehicles or objects. Yet other sensor data collectors 110 could include cameras, breathalyzers, motion detectors, respiration monitors, body temperature sensors, heart rate monitors, etc., i.e., data collectors 110 to provide data for evaluating a condition or state of a vehicle 101 operator.

A memory of the computer 105 generally stores collected data 115. Collected data 115 may include a variety of data collected in a vehicle 101. Examples of collected data 115 are provided above, and moreover, data 115 is generally collected using one or more data collectors 110, and may additionally include data calculated therefrom in the computer 105, and/or at the server 125. In general, collected data 115 may include any data that may be gathered by a collection device 110 and/or computed from such data.

Examples of collected data 115 could include a vehicle 101 operator's current state, e.g., respiration rate, body temperature, eye pupil size, heart rate, etc. Further, such collected data 115 could be used to evaluate a vehicle 101 operator's stress or anxiety level. For example, dilated pupils, rapid heart rate, rapid respiration rate, etc. are possible indicia of stress or anxiety. Further, such measurements in combination with one another may provide an even more reliable indicia of vehicle 101 operator stress or anxiety. In general, the computer 105 collect and store's current data 115 relating to an operator state, where the term "current" is used to refer to data 115 that is generally contemporaneous with the present time, e.g., within a predetermined time of the present time, such as five seconds, 10 seconds, 30 seconds, etc. Further, current data 115 may be stored in a memory of the computer 105, and may further be provided to the server 125 for storage in the data store 130.

As mentioned above, a memory of the computer 105 further generally stores baseline data 116. Various biological data about a vehicle 101 operator could be included in the baseline data 116, e.g., a resting heart rate, a resting respiration rate, an image or images reflecting a normal pupil dilation, and average body temperature, an image or images reflecting a normal skin pigmentation, etc. A vehicle 101 operator could provide baseline data 116 to the computer 105 via a user device 150, an HMI (human machine interface) or the like in the computer 105, etc.

Further, baseline data 116 could be established and/or modified according to collected data 115. For example, the computer 105 could employ various sensor data collectors 110 to obtain data 115 concerning a vehicle 101 operator's average heart rate, respiration rate, pupil dilation in various lighting conditions, etc., over a period of time, e.g., a week, a month, a predetermined number of hours, etc. Values for various biological metrics, e.g., heart rate, respiration rate, etc., could be computed based on such data 115 and stored as baseline data 116. Likewise, baseline data 116, once established, could be adjusted when collected data 115 indicated that, over time, and appropriate baseline value for a vehicle 101 operator's biological metric had changed and/or was not accurately reflected in the current baseline data 116.

The network 120 represents one or more mechanisms by which a vehicle computer 105 may communicate with a remote server 125. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing collected data 115, records relating to potential incidents generated as described herein, etc. Further, the server 125 may store information related to multiple vehicles 101, traffic conditions, weather conditions, etc., within a geographic area, with respect to a particular road, city, etc.

A user device 150 may be any one of a variety of computing devices including a processor and a memory, as well as communication capabilities. For example, the user device 150 may be a portable computer, tablet computer, a smart phone, a wearable device, etc. that includes capabilities for wireless communications using IEEE 802.11, Bluetooth, and/or cellular communications protocols. Further, the user device 155 may use such communication capabilities to communicate via the network 120 and also directly with a vehicle computer 105, e.g., using Bluetooth.

Exemplary Process Flows

Figure 2:
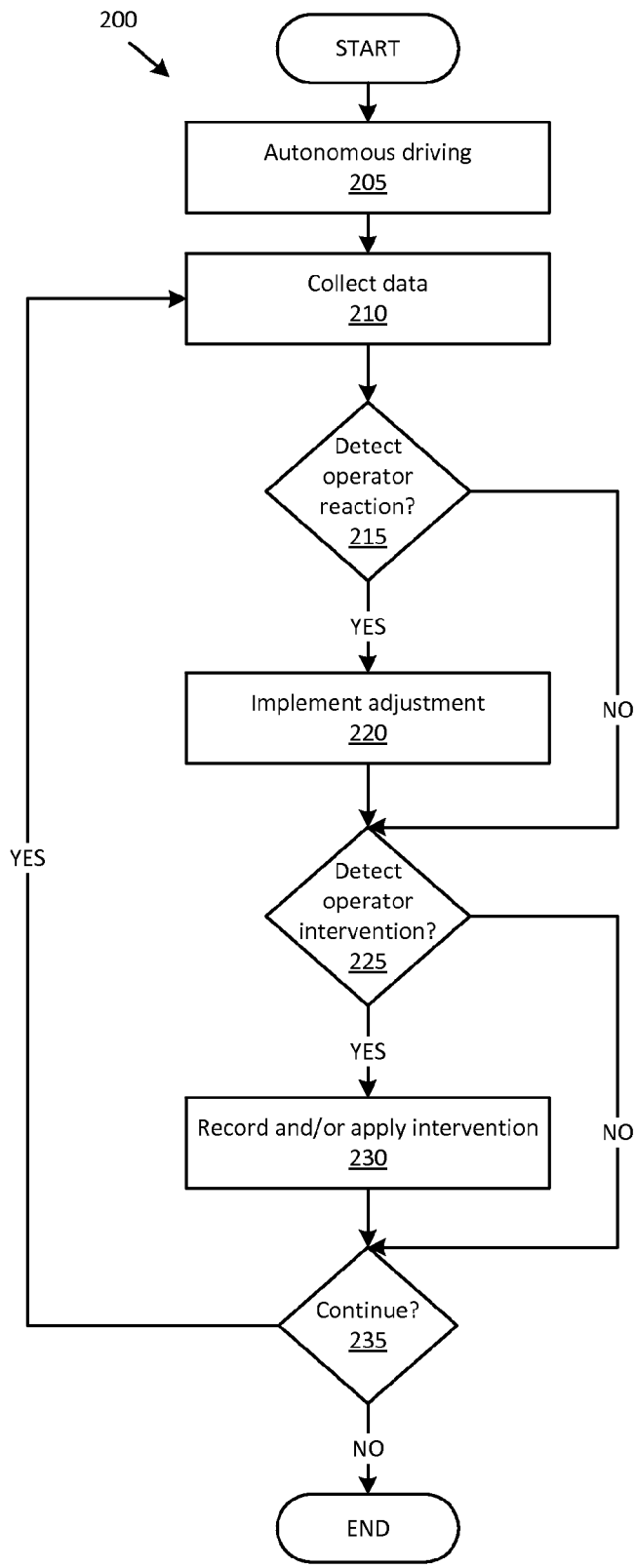
FIG. 2 is a diagram of an exemplary process for detecting and responding to a driver state in an autonomous vehicle.

FIG. 2 is a diagram of an exemplary process 200 for detecting and responding to a driver state in an autonomous vehicle.

The process 200 begins in a block 205, in which a vehicle 101 commences driving operations, which could be semi- or completely autonomous. For example, as mentioned above, the computer 105, e.g., via the module 106, could be configured to control operation of the vehicle 101 based on collected data 115 and/or instructions from the server 125. However, it is also possible that, in the block 205, the vehicle 101 may be in part manually driven by a driver, i.e., some operations, e.g., braking, could be manually controlled by a driver, while other operations, e.g., steering, could be controlled by the computer 105.

Next, in a block 210, the computer 105 receives data 115 relevant to a state of a vehicle 101 operator, e.g., driver. For example, as mentioned above, the computer 105 could use various sensor data collectors 110 to obtain data 115 showing an image of the driver, measuring respiration, pulse rate, etc., and could use various known mechanisms for detecting driver impairment.

Next, in a block 215, the computer 105 compares collected data 115 relating to a vehicle 101 operator state to baseline data 116 for the vehicle 101 operator. For example, the computer 105 could compare vehicle 101 operator pulse rate, respiration rate, skin pigmentation, pupil dilation, etc. to baseline data 116 for the operator. If the comparison indicates that one or more data 115 relating to the operator state meet or exceed a predetermined threshold in the baseline data 116, and a determination may be made that an operator reaction has been detected with respect to vehicle 101 operations. That is, vehicle 101 operations are likely being conducted in a manner so as to cause excessive or unnecessary operator or occupant stress or anxiety. Alternatively or additionally, a comparison in the block 215 could indicate that one or more data 115 relating to an operator state meet or fall below a predetermined threshold in the baseline data 116, whereupon a determination may also be made that an operator reaction has been detected. However, in this latter case, vehicle 101 operations are likely being conducted in a manner resulting in operator or occupant relaxation or low stress. In any event, a reaction is detected, then a block 220 is executed next. Otherwise, the process 200 proceeds to a block 225.

In the block 220, which may follow the block 215, the computer 105 implements an adjustment to autonomous or semi-autonomous operations, e.g., one or more parameters of the autonomous module 106 may be modified. In general, where vehicle 101 operations are detected to possibly cause operator stress or anxiety, vehicle 101 operations may be adjusted to reduce such stress or anxiety. On the other hand, where vehicle 101 operations are conducted in a manner resulting in a relaxed or low-stress occupant, then it may be possible to pursue a more aggressive driving strategy in the module 106.

Accordingly, an adjustment to vehicle 101 operations is generally made by recording vehicle 101 operations occurring at the same time as an occupant reaction detected in the block 215. For example, if occupant stress or anxiety is detected, then the computer 105 may be configured to examine one or more parameters related to vehicle 101 operation at or around (e.g., within five seconds of, 10 seconds off, etc.) a time when the stress was detected. Such parameters could include a vehicle 101 speed, acceleration, deceleration, turning, distance from other vehicles 101, etc. The computer 105 could determine whether these or other parameters had values that could be associated with driver stress or anxiety.

For example, if a vehicle 101 speed was in excess of a posted speed limit, acceleration or deceleration were outside of accepted parameters, a vehicle turn rate exceeded a predetermined threshold, a vehicle was within a predetermined distance of another vehicle 101 at a given speed, etc., then the computer 105 could adjust vehicle 101 operations to modify a value of a parameter likely associated with driver stress or anxiety. For example, the module 106 could cause the vehicle 101 to operate at a lower speed than previously, could modify a parameter governing distance from other vehicles 101, could modify parameters governing turn rates, acceleration, deceleration, etc. Likewise, if a driver was determined to be relaxed at or below a predetermined threshold, the computer 105 could modify one or more parameters in the module 106 to implement a more aggressive driving strategy, e.g., increased vehicle 101 speed, decreased vehicle 101 distance from other vehicles 101, increased turn rates, etc.

The blocks 210, 215, 220 may be executed with respect to more than one occupant of a vehicle 101. Although a "vehicle 101 operator" is frequently referred to herein, a vehicle 101 occupant who is not a vehicle 101 driver or operator may also be a subject of collected data 115 indicating an occupant state. Accordingly, data 115 regarding one or more occupants 210 may be collected in the block 210. Further, data 115 relating to various vehicle 101 occupants may be compared to respective sets of baseline data 116 pertaining to respective vehicle 101 occupants. Yet further, an adjustment or adjustments may be made in the block 220 according to a reaction detected for vehicle 101 occupants in addition to a vehicle 101 operator or driver.

A block 225 may follow either of the blocks 215, 220. In the block 225, the computer 105 determines whether a vehicle 101 operator has performed in intervention to modify in operation executed according to instructions from the module 106. For example, if a driver has applied brakes or an accelerator to modify a vehicle 101 speed when the module 106 has been controlling the speed, the computer 105 may record in intervention. Likewise, the computer 105 could record an operator intervention where the module 106 is controlling steering and the vehicle 101 operator has taken control of steering or modified a course planned by the module 106. If an intervention is detected, then a block 230 is executed next. Otherwise, a block 235 is executed next.

In the block 230, the computer 105 records the driver intervention detected in the block 225. In some cases, the computer 105 further, based on the driver intervention, modifies operations of the autonomous module 106. Alternatively or additionally, the computer 105 may store the driver intervention for future governance of the module 106, e.g., data concerning a driver intervention may be used to modify or adjust baseline data 116. For example, in a case where driver intervention relates to an ongoing operation of the vehicle 101, e.g., maintenance of a speed, maintenance of a distance from other vehicles 101, etc., the computer 105 may store the driver intervention for future reference, but also modify operation of the module 106 to conform to the driver intervention, e.g., implement a different speed parameter, a different distance from other vehicles 101 parameter, etc. However, in a case where driver intervention relates to a completed operation of the vehicle 101, e.g., a turn rate, acceleration or deceleration operation, etc., the computer 105 may simply store the driver intervention and/or modify a parameter of the module 106 to be applied the next time a similar operation, e.g., a turn, accelerating, decelerating, etc., is to be performed.

Following either of the blocks 225, 230, in a block 235, the computer 105 determines whether the process 200 should continue. For example, if the computer 105 is powered off, the vehicle 101 has reached a specified, and operator has provided input to cease collecting data 115 relating to an operator state and/or to cease modifying vehicle 101 operations based thereon, etc., it may be determined that the process 200 should end. If such determination is not made, the process 200 returns to the block 210.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer in a vehicle, the computer comprising a processor and a memory, wherein the computer is configured to:
   perform one or more operations of the vehicle without occupant input;
   store data relating to a baseline state of a specific occupant;
   collect data relating to a current state of the specific occupant;
   perform a comparison of the baseline occupant state to the current occupant state; and
   modify a parameter to control at least one of the one or more operations according to the comparison, the one or more operations including at least one of a speed, deceleration rate, acceleration rate, distance from another vehicle, and turning rate of the vehicle.

2. The system of claim 1, wherein the data relating to the current occupant state includes at least one of a heart rate, a respiration rate, a pupil dilation, and skin pigmentation.

3. The system of claim 1, wherein the computer is further configured to adjust the data relating to the baseline occupant state using data relating to the current occupant state.

4. The system of claim 1, wherein the computer is further configured to:
   store data relating to a second baseline state of the specific occupant;
   collect data relating to a second current state of the specific occupant;
   perform a comparison of the second baseline occupant state to the second current occupant state; and
   modify the parameter governing performance of the one or more operations according to the comparison of the second baseline occupant state to the second current occupant state.

5. The system of claim 1, wherein the computer is further configured to:
   detect a driver intervention with respect to at least one operation performed without operator input; and
   modify a parameter governing performance of the at least one operation based on the detected intervention.

6. The system of claim 5, wherein the computer is further configured to adjust the data relating to the baseline occupant state based on the driver intervention.

7. A system, comprising a computer in a vehicle, the computer comprising a processor and a memory, wherein the computer is configured to:
   perform one or more operations of the vehicle without operator input, the one or more operations including at least one of a speed, deceleration rate, acceleration rate, distance from another vehicle, and turning rate of the vehicle;
   detect a driver intervention with respect to at least one of the one or more operations performed without operator input; and
   modify a parameter to continue to control one or more of the operations for which driver intervention is detected.

8. The system of claim 7, wherein the computer is further configured to adjust the data relating to a baseline occupant state based on the driver intervention.

9. The system of claim 7, wherein the computer is further configured to:
   store data relating to a baseline occupant state;
   collect data relating to a current occupant state;
   perform a comparison of the baseline occupant state to the current occupant state; and
   modify a parameter governing performance of the one or more operations according to the comparison.

10. The system of claim 9, wherein the computer is further configured to adjust the data relating to the baseline occupant state using data relating to the current occupant state.

11. The system of claim 9, wherein the data relating to a current occupant state includes at least one of a heart rate, a respiration rate, a pupil dilation, and skin pigmentation.

12. A method, comprising:
   performing one or more operations of the vehicle without occupant input;
   storing data relating to a baseline state of a specific occupant;
   collecting data relating to a current state of the specific occupant;
   performing a comparison of the baseline occupant state to the current occupant state; and
   modifying a parameter to control at least one of the one or more operations according to the comparison, the one or more operations including at least one of a speed, deceleration rate, acceleration rate, distance from another vehicle, and turning rate of the vehicle.

13. The method of claim 12, wherein the data relating to the current occupant state includes at least one of a heart rate, a respiration rate, a pupil dilation, and skin pigmentation.

14. The method of claim 12, further comprising adjusting the data relating to the baseline occupant state using data relating to the current occupant state.

15. The method of claim 12, further comprising:
   storing data relating to a second baseline state of the specific occupant;

collecting data relating to a second current state of the specific occupant;

performing a comparison of the second baseline occupant state to the second current occupant state; and modifying the parameter governing performance of the one or more operations according to the comparison of the second baseline occupant state to the second current occupant state.

16. The method of claim 12, further comprising:

detecting a driver intervention with respect to at least one operation performed without operator input; and modifying a parameter governing performance of the at least one operation based on the detected intervention.

17. The method of claim 16, further comprising adjusting the data relating to the baseline occupant state based on the driver intervention.

* * * * *